(12) United States Patent
Vauthier

(10) Patent No.: US 7,308,841 B2
(45) Date of Patent: Dec. 18, 2007

(54) SPEED ADJUSTER DEVICES, SYSTEMS, AND METHODS

(76) Inventor: Philippe Vauthier, P.O. Box 3124, Annapolis, MD (US) 21403

( * ) Notice: Subject to any disclaimer, the term of this patent is extended or adjusted under 35 U.S.C. 154(b) by 0 days.

(21) Appl. No.: 11/247,964

(22) Filed: Oct. 11, 2005

(65) Prior Publication Data

US 2006/0075837 A1   Apr. 13, 2006

Related U.S. Application Data

(60) Provisional application No. 60/617,742, filed on Oct. 11, 2004.

(51) Int. Cl.
*F16H 37/06* (2006.01)
*F16H 37/02* (2006.01)
*F03B 9/04* (2006.01)

(52) U.S. Cl. .................. 74/665 B; 475/20; 290/54

(58) Field of Classification Search ............ 475/5, 475/150, 151, 209, 210, 212, 213, 84, 203, 475/329, 343; 74/661, 665 A, 665 B, 665 D, 74/665 E; 290/53, 54
See application file for complete search history.

(56) References Cited

U.S. PATENT DOCUMENTS

| | | | | |
|---|---|---|---|---|
| 1,081,643 A * | 12/1913 | Wills | .................. | 475/151 |
| 1,774,831 A | 9/1930 | Henin | | |
| 3,340,748 A * | 9/1967 | Young | .................. | 74/661 |
| 3,363,472 A * | 1/1968 | Quermann | .................. | 74/5.7 |
| 3,861,484 A * | 1/1975 | Joslin | .................. | 180/65.2 |
| 3,884,097 A * | 5/1975 | Avramidis et al. | .................. | 475/208 |
| 3,911,287 A * | 10/1975 | Neville | .................. | 290/53 |
| 3,986,787 A * | 10/1976 | Mouton et al. | .................. | 415/7 |
| 4,090,416 A * | 5/1978 | Hicks | .................. | 475/5 |
| 4,662,245 A * | 5/1987 | Taylor | .................. | 475/73 |
| 4,848,185 A * | 7/1989 | Moltner et al. | .................. | 475/330 |
| 4,939,949 A * | 7/1990 | Langenberg | .................. | 74/473.1 |
| 6,048,288 A | 4/2000 | Tsujii et al. | | |
| 6,139,255 A | 10/2000 | Vauthier | | |
| 6,168,373 B1 * | 1/2001 | Vauthier | .................. | 415/7 |
| 6,186,922 B1 | 2/2001 | Bursal et al. | | |
| 6,387,007 B1 * | 5/2002 | Fini, Jr. | .................. | 475/268 |

(Continued)

FOREIGN PATENT DOCUMENTS

WO    WO 2006/042244    4/2006

OTHER PUBLICATIONS

International Search Report for PCT/US2005/036473 dated Aug. 28, 2006.

(Continued)

*Primary Examiner*—Roger Pang
(74) *Attorney, Agent, or Firm*—Troutman Sanders LLP; James Hunt Yancey, Jr.

(57) ABSTRACT

Speed adjuster devices, systems, and methods are provided. In an embodiment of the present invention, a speed adjustor device comprises an input shaft, an output shaft, and a housing. The input shaft can receive a first rotational velocity input in a first direction. The housing can receive a second rotational velocity input in a second direction such that the housing rotates relative to the input shaft. The output shaft can be coupled to the input shaft and the housing to provide an output rotational velocity. Other embodiments are also claimed and described.

17 Claims, 3 Drawing Sheets

U.S. PATENT DOCUMENTS

| | | | |
|---|---|---|---|
| 6,715,291 B1* | 4/2004 | Liao | 60/698 |
| 6,878,094 B2* | 4/2005 | Kitamura et al. | 477/5 |
| 7,105,942 B2* | 9/2006 | Henriksen | 290/55 |
| 2006/0244267 A1* | 11/2006 | Fraenkel | 290/54 |

OTHER PUBLICATIONS

Written Opinion of the U.S. International Searching Authority for PCT/US2005/036473 dated Aug. 28, 2006.

* cited by examiner

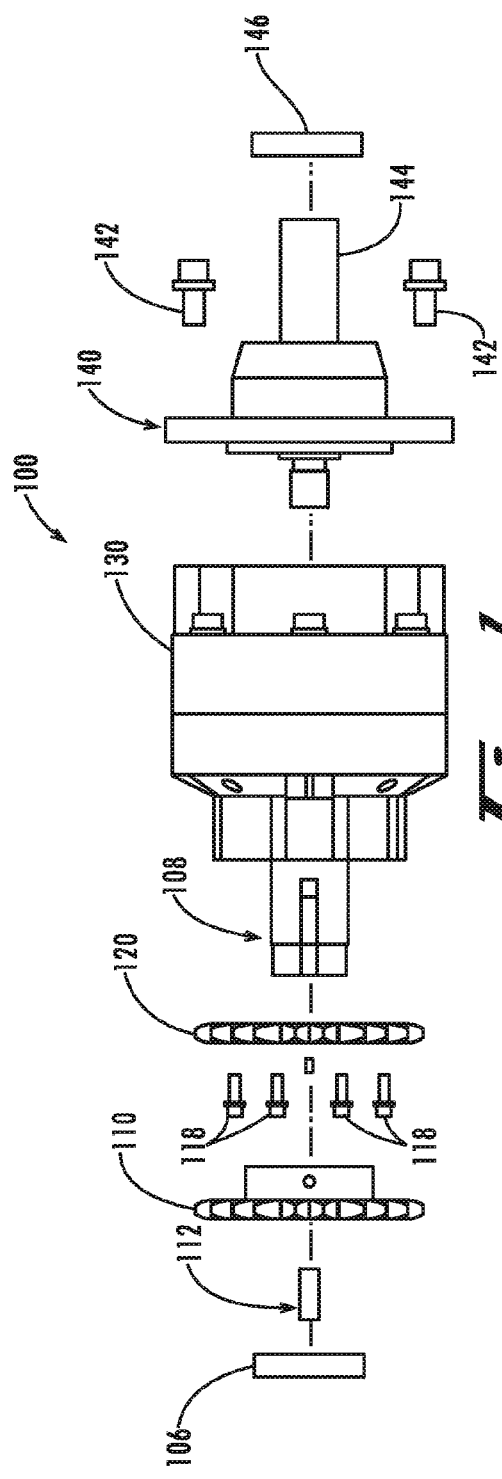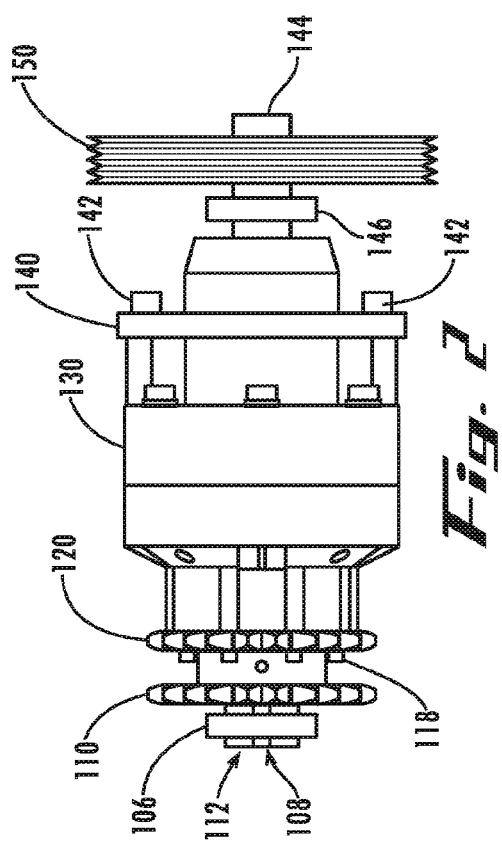

SPEED ADJUSTER DEVICES, SYSTEMS, AND METHODS

CROSS REFERENCE TO RELATED APPLICATION

This patent application claims priority to and the benefit of U.S. Provisional Patent Application Ser. No. 60/617,742, entitled SPEED INCREASER, filed 11 Oct. 2004, which is incorporated herein by reference as if fully set forth below.

TECHNICAL FIELD

The present invention generally relates to speed adjustment mechanisms, and more particularly, to improved speed adjuster devices, system, and methods providing efficient mechanical coupling between turbines and generators.

BACKGROUND

Many methods and systems that couple mechanical components having different optimal rotational velocities are currently used. The typical gear box is one such system. A gear box has a gear ratio that enables an input to the gear box to be adjusted according to the gear ratio, when the gear box provides an output. For example, suppose a gear box has a gear ratio of 1 to 5 and an input of 10 revolutions per minute ("RPM"). Under normal operating circumstances the gear box, in this example, would produce an output of 50 RPM. As those skilled in the art will understand, gear boxes house numerous gears and are designed to provide numerous gear ratios. An increase in gear ratio leads to more expensive and larger gear boxes. Maintenance costs are also higher for gear boxes having increased gear ratios due to an increased number of internal components. Thus, people using gear boxes to couple mechanical components generally want to utilize smaller gear boxes.

An application that utilizes gearboxes are speed adjustors. Speed adjustors receive an input at one speed and provide an output at a different speed. Typically such a conversion is needed because mechanical components have different optimal input and output rotational velocities. The satellite reducing or increasing revolution of a variable or fixed revolving input shaft per minute into a higher or lower speed is well known. Usually applications consist in using a more efficient input of an engine (the driving or input force) into a useable slower output speed delivering an increased torque.

A good output for a standard diesel engine is between 1600 & 1800 RPM. Such engines are used in earth-moving-mining vehicles having large wheels. The large wheels need a tremendous torque at low speed because of their large size and weight of the vehicle's payload. To couple mechanical power from the diesel engine, the output of the diesel engine is converted into a high torque, low speed output by satellite gear reducers such as the "Torque Hub®" built by Fairfield Company, La Fayette, Ind. The input in this example is the engine's drive which transports power to a plurality of satellite gears surrounding the small input gear at the wheels of the vehicle. The satellite gears in turn roll inside the large static inversed gear ring, part of the fixed gear box housing assembly. The satellite gear assembly rotates at a slower speed than the input shaft within the fixed inversed gear ring and further transfers the rotational power to the wheels at an increased useable torque. The gear box is mounted to the frame of the vehicle so that the torque of the output of the gear box is transferred to the large wheels.

While serving their respective purposes, currently used speed adjusters have drawbacks and can be improved. An ideal speed adjuster would utilize the smallest possible gear box for a give set of design constraints. In addition, current speed adjustors are not optimally designed to couple the rotational force of multiple inputs to a single output.

BRIEF SUMMARY

The various embodiments of the present invention provide improved speed adjuster devices, systems, and methods. The embodiments of the present invention provide speed adjusters for coupling multiple components having different optimal rotational speeds. Utilizing a novel coupling of multiple rotational energy inputs enable usage of a speed adjuster according to the present invention that reduces overall device size, component costs, and maintenance costs. The embodiments of the present invention can be used in any application where components having divergent optimal rotational speeds and are especially useful in coupling hydrokinetic turbines to generators or alternators.

A speed adjustor device according to some embodiments of the present invention includes an input shaft, a housing, and an output shaft. The input shaft can receive a first rotational velocity input in a first direction. The housing can receive a second rotational velocity input in a second opposite direction. The housing can also house the input shaft and rotate relative to the input shaft. The output shaft can be coupled to the input shaft satellite drive and the housing to provide an output rotational velocity. The output rotational velocity can be a function of the first and second rotational velocity inputs.

In yet other embodiments of the present invention, a system of using a speed adjustor device with multiple inputs is contemplated. Such system embodiments can comprise a first shaft having a first velocity in a first direction and a second shaft having a second velocity in a second direction. These system embodiments can also comprise an input shaft, a housing, and an output shaft. The input shaft can be coupled to the first shaft and rotate at the first velocity in the first direction since it is coupled to the first shaft. The housing can be coupled to the second shaft, and the housing can rotate at the second velocity in the second direction since it is coupled to the second shaft. The housing also rotates relative to the input shaft. The output shaft can be coupled to the input shaft and the housing, and the output shaft can rotate at an output velocity that is a function of the first velocity and the second velocity.

These embodiments and other embodiments are discussed in more detail below with detailed reference to the figures, but the full scope of the various embodiments of the present invention is not limited to these embodiments. Rather, the full scope of the various embodiments of the present invention is defined by the appended claims and all equivalents.

BRIEF DESCRIPTION OF THE DRAWINGS

FIG. 1 illustrates an exploded view of a speed increaser according to some embodiments of the present invention.

FIG. 2 illustrates a perspective view of a speed increaser according to some embodiments of the present invention.

Similar reference characters refer to similar parts or components of the embodiments of the present invention throughout the several views of the drawings.

DETAILED DESCRIPTION OF PREFERRED EMBODIMENTS

Figure 3:
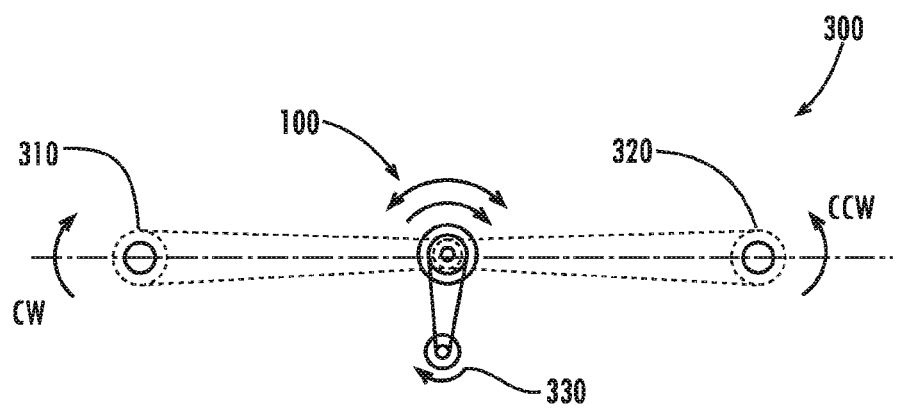
FIG. 3 illustrates a back view of a schematic diagram of a speed increaser in a multiple turbine system according to some embodiments of the present invention.

The various embodiments of the present invention enable system designers to design systems that have more efficient mechanical coupling. In addition, the embodiments of the present invention permit system designers to use gearboxes with lower gearbox ratios thereby decreasing the physical size of a mechanical coupling system and decreasing the cost of a mechanical coupling system due, in part, to the decreased cost of a gearbox having a lower gearbox ratio. The embodiments of the present invention can be used to provide an output shaft speed that is higher or lower than an input shaft speed based on a specific gear ratio of a gearbox and the specific application. The embodiments of the present invention can be used with various existing gearboxes and enable system designers to modify existing gearboxes to take advantage of the features discovered by the inventor. For example, some embodiments of the present invention can be used to efficiently couple the power output of multiple turbines to a voltage generator. Using a common speed adjustor device to receive multiple energy inputs from multiple turbines increases the final rated output by a factor of almost two without changing the gearing of a standard gear box and eliminates the need for electronic synchronization devices required for systems having multiple voltage generators.

FIG. 1 illustrates an exploded view of an embodiment of a speed increaser device 100 according to some embodiments of the present invention. The device 100 generally includes a first sprocket 110 (also known as an input/satellite sprocket), a second sprocket 120 (also known as an input/body sprocket), a gear housing 130, and an output portion 140. The device 100 can also include an input shaft bearing ring 106, an input shaft 108, an output shaft 144, and an output shaft bearing ring 146. The device 100 can further include various fasteners and apertures adapted to hold the device 100 together, such as bolts 118, 142. In addition a key fastener, such as key 112, can secure the first sprocket 110 to the input shaft 108.

The device 100 receives multiple rotational speed inputs and provides a rotational speed output that has a different speed than the rotational speed inputs. The first sprocket 110 is coupled to the input shaft 108 and receives a first input rotational speed such that the input shaft rotates at the first input rotational speed and rotates relative to the housing 130. The first input rotational speed also rotates in a first direction, which can be clockwise according to some embodiments of the present invention. The input shaft 108 extends from the housing 130 and is also partially housed within the housing 130. The input shaft 108 is coupled to a gearbox (not shown), which is also housed within the housing 130. The input shaft 108 is rotatably coupled to the housing such that it can rotate relative to the housing 130. Since the gearbox is coupled to the output shaft 144, the input shaft 108 is also coupled to the output shaft 144. As used herein, coupled can mean directly and indirectly coupled. As those skilled in the art will understand, the device 100 receives the first input rotational speed and adjusts it according to a gearbox ratio of the gearbox to provide the desired output rotational speed. Depending on the gearbox ratio, the output rotational speed can be faster or slower than the input rotational speed and have a different associated torque.

The second sprocket 120 can also receive a rotational speed input. Preferably, the second sprocket 120 is coupled to the housing 130 and receives a second input rotational speed such that the housing 130 rotates at the second input rotational speed and rotates relative to the input shaft 108. Typically, current speed adjustors only have a single rotational speed input and have a housing that is held stationary. The inventor has discovered that introducing a second rotational speed input increases the total overall rotational speed input. Increasing the overall energy input with another velocity input allows the gearbox ratio within the gearbox to be decreased to provide the desired output rotational speed. Reducing the gearbox ratio enables use of a cheaper, smaller, and simpler gearbox having reduced maintenance costs. The second sprocket 120 can be mounted or secured to the housing 130 with bolts 118 so that the second input rotational speed can be provided to the device 100. The second input rotational speed can be in a different direction, such as counter-clockwise, than the direction of the first rotational speed such that the input shaft 108 and the housing 130 rotate in different directions relative to each other. Preferably, the magnitude of the two input velocities are approximately equal, but the magnitude of the two input velocities can be different according to some embodiments of the present invention.

The inventor has discovered that conventional off-the-shelf gearboxes can be utilized in accordance with the embodiments of the present invention. Conventional gearboxes typically must, however, be modified. Importantly, conventional gearboxes have to be modified to receive multiple inputs, such as a second rotational speed input. Adding and mounting a second sprocket 120 to the housing 130 is a method of modifying a conventional gearbox to receive a second rotational speed input. Conventional gearboxes can also be modified so that their housing can freely rotate, such as housing 130. Typically, gearboxes are manufactured with flanges or other such mechanical features so that the gearbox can be held stationary. A method of modifying a conventional gearbox so that it can freely rotate involves removing the flanges or other similar mechanical features. Removing these items allows a conventional gearbox to rotate freely and removes mass from a conventional gearbox housing so that its rotation is balanced and does not have unwanted vibrations.

FIG. 2 illustrates a perspective view of a speed increaser device 100 according to some embodiments of the present invention. As shown, the various components discussed above have been assembled together to form the device 100. The bearing rings 106, 146 can be attached to the input shaft 108 and the output shaft 144, respectively, so that the device 100 can be supported without adversely affecting the rotation of the housing 130. In addition, a pulley wheel 150 can be attached to the output shaft 144 so the output rotational speed can be transferred or coupled to another component or device. A coupling mechanism such as a belt or chain can be used to couple the output rotational speed of the output shaft 144, and the output shaft 144 can also be coupled in direct drive fashion to another device.

FIG. 3 illustrates a back view of a schematic diagram of a speed increaser device 100 in a dual turbine system 300 according to some embodiments of the present invention. While the embodiments of the present invention can be utilized in any system, the inventor has found the embodiments of the present invention especially useful in the dual turbine system 300. The dual turbine system 300 can include turbines such as those discussed in U.S. Pat. No. 6,139,255, entitled "DUAL HYDROTURBINE UNIT," and U.S. Pat. No. 6,168,373, entitled "BI-DIRECTIONAL HYDROTURBINE ASSEMBLY FOR TIDAL DEPLOYMENT." The contents of these U.S. Pat. Nos. (6,139,255 & 6,186,373) are incorporated herein by reference as is fully set forth in this application.

The dual turbine system 300 generally includes the speed adjustor device 100, a first turbine 310, a second turbine 320, and a voltage generator 330. The voltage generator 330 can be a generator, alternator, or any device capable of converting mechanical energy into electricity. The device 100 can be used to couple the turbines 310, 320 to the voltage generator 330. The turbines 310, 320 can be utilized to harness the kinetic energy in a body of water and output the kinetic energy by providing a rotating shaft. As those skilled in the art will understand, the turbines 310, 320 have an optimal rotational speed output and the voltage generator 330 can have a different optimal rotational speed input at which the voltage generator efficiently produces electricity. For example, the turbines 310, 320 may have an optimal rotational speed output of approximately 48 RPM to approximately 52 RPM operating in water having a flow rate of approximately five knots and the voltage generator 330 can optimally produce electricity with an input rotational speed of 3,000 RPM. The device 100 can accept the output rotational speed of the turbines 310, 320 and provide a rotational output speed closer to or approximately equal to the optimal input rotational speed of the voltage generator 330. This configuration provides efficient coupling between multiple energy inputs (turbines 310, 320) and the voltage generator 330.

The embodiments of the present invention enable the gearbox ratio required in a device 100 to adjust the input speed to the desired output speed to be lowered. A conventional speed adjustor would need a gearbox ratio of approximately one to sixty (1:60 ratio) to convert approximately 50 RPM to approximately 3,000 RPM. Those skilled in the art will know that such a large gearbox ratio will require a very expensive and very large gearbox. Utilizing the embodiments of the present invention, a smaller and cheaper gearbox can be utilized. By modifying a conventional gearbox to accept a second rotational input in a direction different than a first rotational input, a smaller gearbox ratio can be utilized. In continuing with the above example, a gearbox ratio of approximately one to thirty (1:30 ratio) can be utilized to adjust the approximately 50 RPM input to the approximately 3,000 RPM output by rotating the housing 130 and the input shaft 108 of the device 100. Thus, the embodiments of the present invention enable system designers to use a gearbox with a lower gearbox ratio. The inventor has discovered that output shaft 108 of the device 100 is adjusted by a factor of approximately two due to the device 100 receiving rotational energy from the turbines 310, 320.

Figure 4:
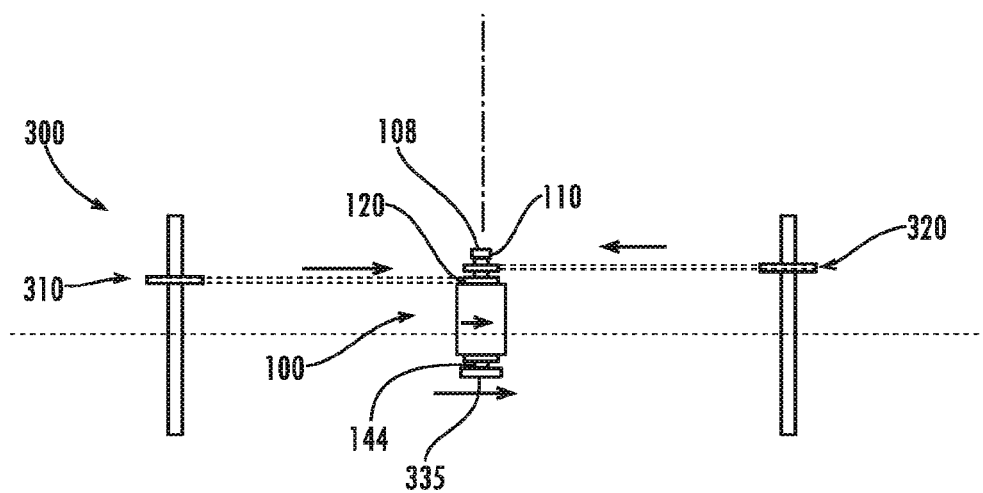
FIG. 4 illustrates a top view of a schematic diagram of a speed increaser in a multiple turbine system according to some embodiments of the present invention.

FIG. 4 illustrates a top view of a schematic diagram of a speed increaser device 100 in a dual turbine system 300 according to some embodiments of the present invention. As shown the device 100 is generally disposed between the turbines 310, 320 and coupled to each of the turbines 310, 320. The turbines 310, 320 each have a shaft to provide output mechanical energy. A chain, belt, or other coupling mechanism can be used to couple the shafts of the turbines 310, 320 to the device 100. The first turbine 310 can be coupled to the first sprocket 110 and rotate the first sprocket 110 in a clockwise direction. And the second turbine 320 can be coupled to the second sprocket 120 and rotate the second sprocket 120 in a counter-clockwise direction. Thus, the turbines 310, 320 provide rotational energy to the input shaft 108 and the housing 130 of the device 100. The device 100 then changes or adjusts the rotational speed of the turbines 310, 320 to an optimal rotation input speed of the voltage generator 330. As illustrated in FIGS. 3 and 4, a coupling mechanism 335 can couple the output shaft 144 to the voltage generator 330.

As mentioned above, the system 300 can utilize hydroturbines as turbines 310, 320. While not specifically shown in the drawings more than two hydroturbines can be utilized in the system 300 according to some embodiments of the present invention. The turbines 310, 320 can be orientated to yield rotational speed outputs in different directions such than one output is rotating clockwise and the other output is rotating counter-clockwise as shown in FIGS. 3 and 4. This orientation will assist in balancing a multiple hydroturbine unit, such as system 300 because the thrust of the turbines will counteract each other. Also, the speed increaser device 100, due to the rotation of the housing 130, can act as a gyroscope that can also assist in balanacing a multiple hydroturbine unit such a system 300. More specifically, the housing 130 can serve as a spatial stabilizing gyroscope that can assist in stabilizing a multiple hydroturbine unit immersed in a moving or flowing body of water.

Figure 5:
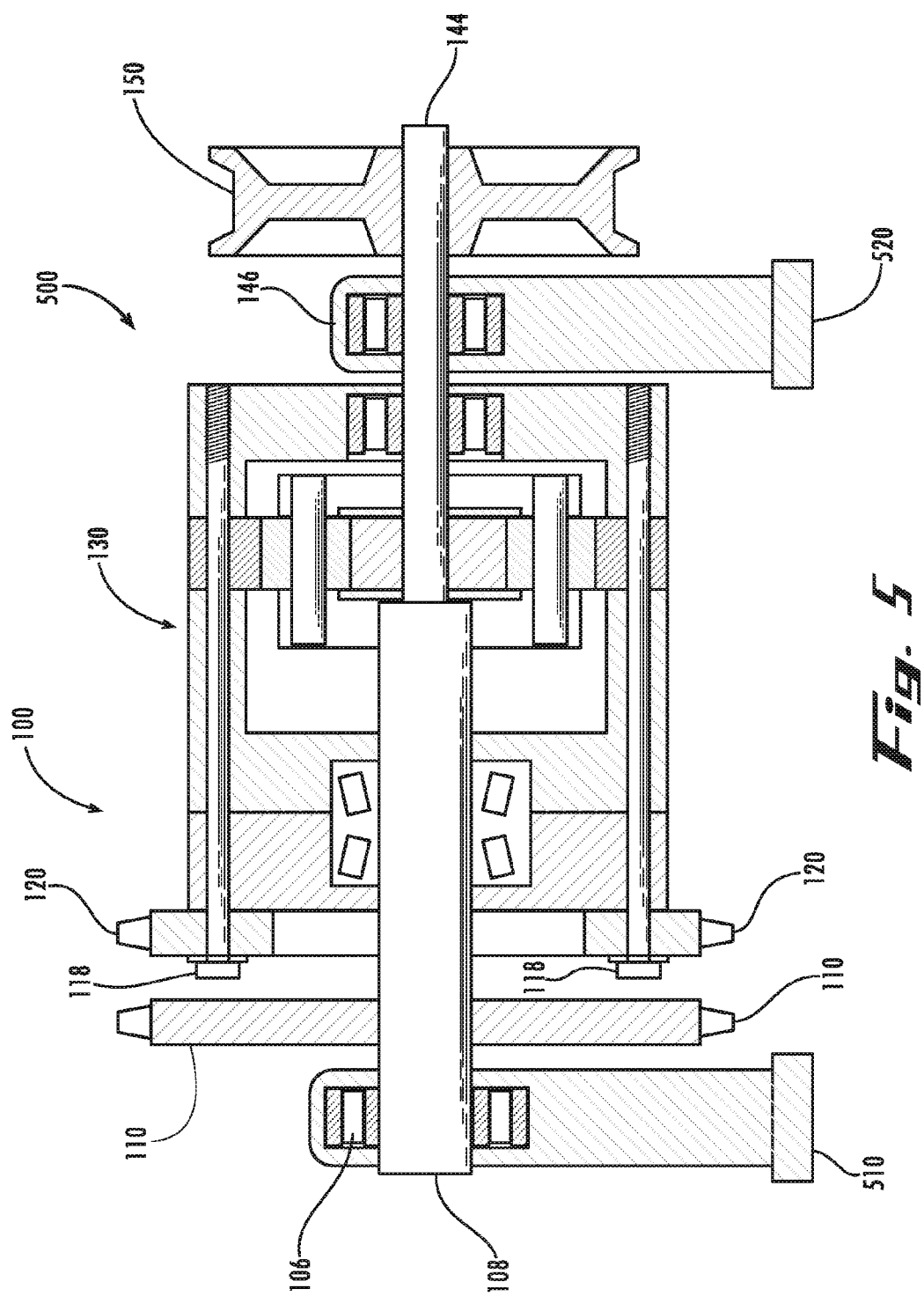
FIG. 5 illustrates a perspective view of a speed increaser system according to some embodiments of the present invention.

FIG. 5 illustrates a perspective view of an embodiment of a speed increaser system 500 according to some embodiments of the present invention. The system 500 generally includes a speed increaser device 100, a first supporting base 510, and a second supporting base 520. The first supporting base 510 can house the first bearing ring 106, and the second supporting base 520 can house the second bearing ring 146. Supporting the speed adjustor device in this manner enables multiple rotational inputs to be provided to the speed adjustor device 100 and enables the input shaft 108 and the housing 130 of the speed adjustor device 100 to rotate freely about a common axis. As shown, the input shaft 108 can be inserted into the first bearing ring 106 housed by the first supporting base 510. Also, the output shaft 144 can be inserted into the second bearing ring 146 housed by the second supporting base 520. Preferably, the supporting bases 510, 520 are sized and adapted such that the input shaft 108 and the output shaft 144 have a common central axis. This advantageous configuration enables efficient energy transfer from multiple energy sources to an associated generator or alternator.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

I claim:

1. A speed adjustor device comprising:
    an input shaft to receive a first rotational velocity input in a first direction;
    a housing to receive a second rotational velocity input in a second direction, wherein the housing houses the input shaft and rotates relative to the input shaft;
    a first sprocket coupled to the input shaft proximate a first end of the housing to provide the first rotational velocity, the first sprocket defining an aperture disposed generally around the input shaft; and a second sprocket spaced apart from the first sprocket and coupled proximate the first end of the housing such that the second sprocket is generally disposed between the first sprocket and a middle portion of the housing, the second sprocket to provide the second rotational velocity input, and the second sprocket having substantially the same circumference as the first sprocket;

an output shaft coupled to the input shaft and a second end of the housing to provide an output rotational velocity;

the first sprocket and the second sprocket located on a corresponding side of the housing opposing the output shaft such that the first and second sprocket are co-located proximate the input shaft and the second sprocket being spaced apart from the middle portion of the housing;

and a first supporting base and a second supporting base being spaced apart from and situated at opposing ends of the housing, the first and second sprockets being disposed between the first supporting base and an end of the housing, and the first supporting base and the second supporting based disposed such that the rotational axes of the input shaft and the output shaft are substantially co-planar.

2. The device of claim 1, wherein the first direction is clockwise and the second direction is counter-clockwise.

3. The device of claim 1, wherein the housing and the input shaft rotate freely about a common axis.

4. The device of claim 1, wherein the first rotational energy input and the second rotational velocity inputs have approximately equal magnitudes.

5. The device of claim 1, wherein the housing comprises a gearbox, and wherein the gearbox provides the output rotational velocity based on the first and second rotational velocity inputs.

6. The device of claim 5, wherein the gearbox has a gearbox ratio, wherein the output rotational velocity is adjusted by a factor of approximately two such that the output rotational velocity is one of approximately twice the gearbox ratio and approximately half the gearbox ratio.

7. In a hydro-turbine system to generate hydro-electricity that comprises at least two hydro-turbines submerged in a flow of water, a system to adjust and couple outputs of the hydro-turbines, comprising:

a first shaft having a first velocity in a first direction;

a second shaft having a second velocity in a second direction;

an input shaft coupled to the first shaft by a first sprocket and a first flexible connecting member that is disposed between the first shaft and the first sprocket, the input shaft rotating at the first velocity in the first direction, the input shaft having a portion disposed within a first bearing ring, the first bearing ring carried by a first supporting base such that the first supporting base supports the input shaft;

a housing coupled to the second shaft by a second sprocket and a second flexible connecting member that is disposed between the second shaft and the second sprocket, the housing rotating at the second velocity in the second direction, wherein the housing rotates relative to the input shaft with a common axis of rotation and wherein rotation of the housing stabilizes the housing;

an output shaft coupled to the input shaft and the housing, the output shaft rotating at an output velocity that is a function of the first velocity and the second velocity, the output shaft having a portion disposed within a second bearing ring, the second bearing ring carried by a second supporting base such that the second supporting base supports the output shaft; and the first supporting base and the second supporting base being spaced apart from and situated at opposing ends of the housing with the first and second sprockets being disposed between the first supporting base and an end of the housing, and the first supporting base and the second supporting based configured such that the rotational axes of the input shaft and the output shaft are substantially co-planar.

8. The system of claim 7, wherein the first direction is clockwise and the second direction is counter-clockwise.

9. The system of claim 7, further comprising: a first turbine that rotates the first shaft and a second turbine rotates the second shaft, wherein the input shaft is disposed between the first and second turbine.

10. The system of claim 7, further comprising a voltage generator coupled to the output shaft to receive the output velocity, the voltage generator providing an output voltage in response to receiving the output velocity.

11. The system of claim 7, wherein the magnitudes of the first and second velocities are approximately equal.

12. The system of claim 7, further comprising a gearbox having a gear ratio housed within the housing, the gearbox adapted to receive the first and second velocities and provide the output velocity according to the gear ratio.

13. The system of claim 12, wherein the output velocity is adjusted by a factor of approximately two such that the output rotational velocity is one of approximately twice the gearbox ratio and approximately half the gearbox ratio.

14. A method of adjusting and coupling the output of multiple hydro-turbines disposed in a flow of water, the method comprising:

providing at least two spaced-apart hydro-turbines submerged in water, one hydro-turbine having an output in a first direction and another hydro-turbine having an output in a second direction;

providing a speed adjustor device intermediate the at least two spaced-apart hydro-turbines in the flow of water, the speed adjustor device comprising an imput shaft,a housing, and an output shaft;

providing a first sprocket proximate an end of the housing and coupling the first sprocket with a first flexible coupling member to the one hydro-turbine having the output in the first direction, the first sprocket being coupled to the input shaft such that the input shaft is configured to rotate in the first direction;

providing a second sprocket spaced apart from and proximate the first sprocket and coupling the second sprocket with a second coupling member to the another hydro-turbine having the output in the second direction, the second sprocket being coupled to the housing such that the housing is configured to rotate in the second direction;

operatively coupling the output shaft to the input shaft and the housing such that the output shaft has a rotational speed dependent at least partially upon the rotational speeds of the outputs of the at least two spaced-apart hydro-turbines; and providing a first supporting base and a second supporting base on either side of the housing and spaced apart from the housing. the first supporting base carrying a first bearing ring to receive the input shaft such the first supporting base supports the input shaft, the second supporting base carrying a second bearing ring to receive the output shaft such that the second supporting base supports the output shaft.

15. The method of claim 14, further comprising a gear box within the speed adjustor device, the gear box configured to receive input rotational velocities from the input shaft and the housing and to provide an input rotational velocity to the output shaft.

16. The method of claim 14, further comprising providing a first supporting base to support the input shaft and a second supporting base to support output shaft and configuring the first supporting base and the second supporting base such that the input shaft and output shaft have rotational axes that are substantially co-planar.

17. The method of claim 14, further comprising providing the first and second sprockets on the same side of the housing such that the sprockets are co-located proximate the input shaft.

* * * * *